(12) United States Patent
Kinser et al.

(10) Patent No.: US 8,049,359 B2
(45) Date of Patent: Nov. 1, 2011

(54) METHOD FOR ALLOCATING HIGH VOLTAGE ELECTRICAL ENERGY TO VEHICLE SYSTEMS DURING PROPULSION

(75) Inventors: Christopher A. Kinser, Grand Blanc, MI (US); James D. Marus, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 12/581,563

(22) Filed: Oct. 19, 2009

(65) Prior Publication Data

US 2011/0089758 A1 Apr. 21, 2011

(51) Int. Cl.
*B60L 1/00* (2006.01)
(52) U.S. Cl. ....................................................... 307/9.1
(58) Field of Classification Search ............... 307/9.1
See application file for complete search history.

(56) References Cited

U.S. PATENT DOCUMENTS

| 5,017,799 A | 5/1991 | Fishman |
| 2006/0253237 A1 | 11/2006 | Dannenberg et al. |

*Primary Examiner* — Robert L. Deberadinis
(74) *Attorney, Agent, or Firm* — Lionel D. Anderson; Reising Ethington P.C.

(57) ABSTRACT

A method is disclosed that defines a protocol for distributing power to high voltage components when two conditions exist: they being when the vehicle is being propelled or operated and when the power requested of the power supply is less than what the power supply can provide. The method determines which high voltage components can receive reduced or intermittent voltage and still allow the vehicle to operate in a proper manner. Calibrations of the usage and energy loss are based on parameters that dictate how important it is that a particular high voltage component receives as much of its requested power as possible. The critical function components will be weighted differently than those less critical components.

22 Claims, 6 Drawing Sheets

Figure 6

METHOD FOR ALLOCATING HIGH VOLTAGE ELECTRICAL ENERGY TO VEHICLE SYSTEMS DURING PROPULSION

TECHNICAL FIELD

The present invention generally relates to allocating high voltage energy and, more particularly, to a system and method that allocates high voltage energy while a vehicle is in motion.

BACKGROUND

As vehicles transition from platforms that incorporate internal combustion engines to other sources, traditional protocols as to how a vehicle is to operate begin to fail to appreciate all the varying issues that now are a part of the likely scenarios when operating the vehicle. One such example includes the operation of a vehicle that is powered by a source other than an internal combustion engine where the energy stored or being created does not exceed the amount of energy requested by the operator of the vehicle. In the instances when energy is being requested to power high voltage components such as the power train, the battery thermal condition system, the steering assembly, the cabin conditioning assembly or the braking assembly, simply shedding those loads from the source circuit is not acceptable as it may lead to customer dissatisfaction during the operation of the vehicle or while it is moving.

SUMMARY

According to one embodiment, there is provided a method for calibrating the amount of power distributed to a vehicle having high voltage components. The method includes the step of calculating a power needed to operate the high voltage components. An amount of power available to operate the high voltage components is then measured. A determination is made as to whether the amount of power available is less than the power needed. A parameter for each of the high voltage components is then identified. Calibration of a dynamic distribution of power occurs and is based on the parameter when the amount of the power available is less than the amount of the power needed. The distribution of power maintains an optimal operation of the high voltage components in a manner that optimizes operation of the vehicle. A recalibration of the dynamic distribution of power occurs as the parameter for each of the high voltage components changes during the operation of the vehicle.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described below maybe used with any vehicle having a power train other than a tradition internal combustion engine. With such non-traditional power train platforms, high voltage systems are used to supply energy in sufficient amounts to power a vehicle and the loads it carries for a period of time. The systems may use fuel cells, batteries or even an internal combustion engine generator, but they all require high voltage power trains to operate. In addition, high voltage components are used to facilitate the operation of the vehicle, especially in the propulsion of the vehicle. For purposes of this discussion, high voltage is considered anything greater than 60 volts. It should be appreciated by those skilled in the art that this definition of high voltage will always include electrical systems having a voltage sufficient to be the source of power for the power train of the vehicle.

Figure 1:
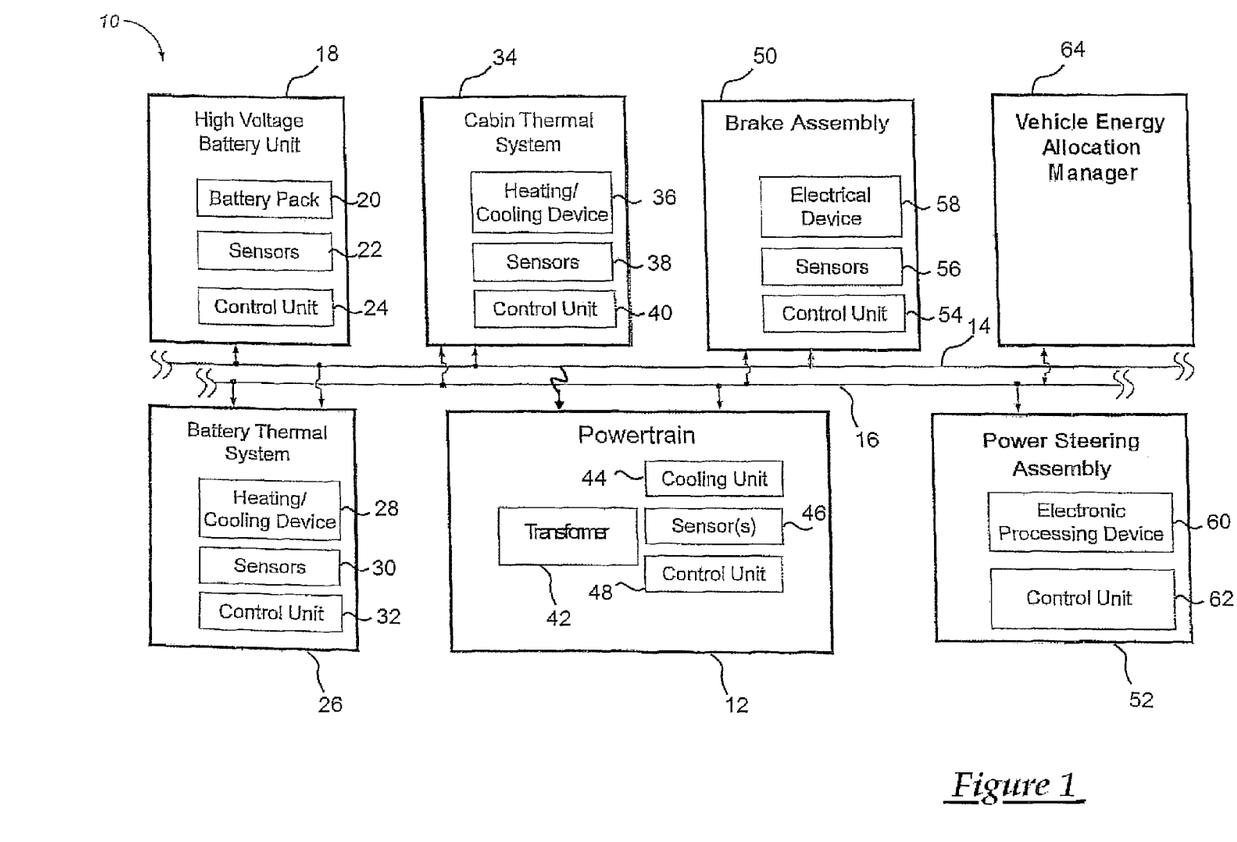
FIG. 1 is block diagram of an exemplary power system for operating a vehicle other than an internal combustion engine vehicle.

With reference to FIG. 1, there is shown an exemplary electrical circuit 10 for a vehicle that includes an electrically driven power train 12. "Electrically driven power train" broadly includes any type of power train that uses a high voltage source to create the power to drive the vehicle. Some examples that include these types of power trains include, but are not limited to, plug-in hybrid electric vehicles (PHEV), which include both and internal combustion engine and an electric motor in the vehicle power train, as well as battery electric vehicles (BEVs), which solely rely upon an electric motor for vehicle propulsion. Another example of such a power train includes a power train that receives energy from an onboard hydrogen plant that converts hydrogen into energy. Although the following description will only describe use of the inventive method with a BEV, it should be appreciated that the method can be used with any other type of electrically driven power train in that the following example is used for purposes of clarity and simplification.

According to this particular embodiment, the electrical circuit 10 includes a high voltage connection 14 and a low voltage/communication bus 16. The circuit, bus or other suitable high voltage connection 14 may be used to provide electrical power to the various high voltage components, discussed in greater detail subsequently, while the low voltage/communication bus 16 may be used to exchange information, data, and messages or otherwise communicate between the various systems and components. All of the components shown in FIG. 1 may be fixedly mounted and located on the vehicle (not shown).

The electrical circuit 10 includes a high voltage battery unit 18 that provides the vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 20, one or more battery sensors 22, and a control unit 24. The battery pack 20 may include a collection of identical or individual battery cells connected in series, parallel, or a combination of both in order to deliver a desired voltage, amperage, capacity, power density, and/or other performance characteristics. Generally, it is desirable to provide high power and energy densities, which has led to the development and use of many types of batteries including chemical, nonchemical and others. Some examples of suitable battery types include all types of lithium-ion (e.g., lithium iron phosphate, lithium nickel manganese cobalt, lithium iron sulfide, lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. The battery pack 20 may provide approximately 60-600V, depending on its particular design and application. For example, a heavy truck using a two-mode hybrid system may require a high voltage battery pack capable of providing about 350V, whereas a lighter vehicle may only need about 200V. The battery pack 20 should be designed to withstand repeated charge and discharge cycles and to receive electrical energy from an external power source (not shown, but understood to be used at least in part for charging). Skilled artisans will appreciate that the system and method described herein are not limited to any one particular type of battery or battery arrangement, as a number of different battery types could be employed.

The battery sensors 22 may include any combination of hardware and/or software components capable of monitoring battery conditions such as battery temperature, battery voltage, battery current, battery state of charge (SOC), battery state of health (SOH), etc. These sensors may be integrated within high voltage battery unit 18 (e.g., an intelligent or smart battery), they may be external sensors located outside of the battery unit 18, or they may be provided according to some other known arrangement. The battery temperature sensors may monitor and determine the battery temperature on a cell-by-cell basis, as an average or collective temperature of a block of cells or a region of the battery unit, as the average or collective temperature of the entire battery unit, or according to some other temperature determining method known in the art. Measuring battery temperature on an individual cell basis may be beneficial if, for example, the middle cells exhibit different temperatures than the edge or boundary cells of battery pack 20. The same principal of determining battery temperature on a cell-by-cell, collective or other basis also applies to battery voltage, battery current, battery SOC, battery SOH, etc. Output from battery sensors 22 may be provided to control unit 24, a battery charging control module (not shown), or some other appropriate device.

The control unit 24 may include any variety of electronic processing devices, memory devices, input/output (I/O) devices, and other known components, and may perform various control and/or communication related functions. For example, the control unit 24 could receive sensor signals from the various battery sensors 22, package the sensor signals into an appropriate sensor message, and send the sensor message to the battery charging control module over the low voltage/communication bus 16. It is possible for control unit 24 to gather battery sensor readings and store them in local memory so that a comprehensive sensor message can be provided at a later time, or the sensor readings can be forwarded as soon as they arrive at control unit 24, to cite a few possibilities. Instead of sending the battery sensor readings to a battery charger control module for subsequent processing, it is possible for control unit 24 to process or analyze the sensor readings itself. In another capacity, control unit 24 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

A battery thermal system 26 is thermally coupled to the high voltage battery unit 18 so that it can manage, control or otherwise manipulate aspects of the environment that can affect the performance of the high voltage battery unit 18. For example, the battery thermal system 26 may include a cooling and/or heating device 28 that can lower or raise the temperature of high voltage battery unit 18. Skilled artisans will appreciate that the charging and discharging performance, the life span, as well as other characteristics of the battery pack 20 may be influenced by temperature. When starting a vehicle in an extremely cold environment, for example, the battery thermal system 26 can use a heating device to warm up the battery pack 20 to a temperature that is better suited for charging, discharging, etc. Conversely, the battery thermal system 26 may include a cooling device, like a compressor, to reduce the temperature of battery pack 20 during charging, discharging, etc. so that it is maintained at a lower and more desirable temperature. According to an exemplary embodiment, the battery thermal system 26 includes one or more heating/cooling devices 28, sensors 30, and a control unit 32. Some examples of a suitable heating/cooling device 28 include: compressors, fans, water jackets, air passages, heat sinks, thermoelectric coolers (e.g., Peltier devices), internal resistive heating, condensers, or some combination thereof. The heating/cooling device 28 may include passive devices (e.g., devices that rely on the non-heated and non-cooled ambient environment to manipulate temperature), active devices (e.g., devices that actively add or remove heat from the system to manipulate temperature), or both. The sensors 30 and the control unit 32 that are included within battery thermal system 26 may be similar to those included within the high voltage battery unit 18; thus, the previous description of those components applies here as well. It is also possible for battery thermal system 26 to rely on the sensor readings and other information from the sensors 22 of the high voltage battery unit 18, in which case the sensors 30 in the battery thermal system 26 may be omitted.

It therefore does not matter whether the cooling and/or heating devices are specifically bundled within the high voltage battery unit 18 or the battery thermal system 26; they will henceforth be treated as if they are a part of battery thermal system 26, whether or not they physically reside there. According to the exemplary embodiment shown here, the battery thermal system 26 is connected to high voltage circuit 14 so that it can receive high voltage electrical power from the high voltage battery unit 18, and is connected to a low voltage/communication bus 16 so that it can send messages and exchange information with other devices in the system. Other connections and arrangements are possible.

A cabin thermal system 34 is thermally coupled with the cabin or interior of the vehicle so that it can manage, control or otherwise manipulate aspects of the environment within that space. For instance, the cabin thermal system 34 may include the vehicle's heating, ventilation and air conditioning (HVAC) system, which manipulates the environmental conditions within the vehicle cabin, including but not limited to thermal conditions and air filtration. In an exemplary embodiment, the cabin thermal system 34 includes one or more heating/cooling devices 36, sensors 38, and a control unit 40. The heating/cooling devices 36 include any device or component that is capable of influencing or affecting the environment within the vehicle cabin. This may include, for example, heaters, air conditioning compressors, seat heaters, steering wheel heaters, fans, etc. The sensors 38 and the control unit 40 that are included within cabin thermal system 34 may be similar to those included within the high voltage battery unit 18; thus, the previous description of those components applies here as well. According to this particular embodiment, the cabin thermal system 34 is connected to high voltage circuit 14 so that it can receive high voltage electrical power from the high voltage battery unit 18, and is connected to low voltage/communication bus 16 so that it can send messages and exchange information with other devices in the system. Other connections and arrangements are possible, as this is only one potential.

Another high voltage component, the power train 12, is also connected to both the high voltage connection 14 and the low voltage/communication bus 16. The power train 12 includes a control unit 48 that allows the power train 12 to receive high voltage energy and uses electric motors 42 to transform the high voltage energy into a motive force that propels the vehicle. The power train 12 is operatively connected to wheels that will rotate in one direction or another to propel the vehicle forward or backward. The power train 12 includes a cooling unit 44 and sensors 46. These subcomponents are similar to those discussed above and will operate in a fashion similar thereto in order to control the power train 12 and to allow it to operate in an optimal fashion.

Two other high voltage components that are also connected to the high voltage connection 14 and the low voltage/communication bus 16 are a braking assembly 50 and a power steering assembly 52. These two high voltage components or systems 50, 52 act as they do traditionally in many cases, but they may also create drains on the high voltage battery unit 18 because they need energy to operate. In the case when the host vehicle is a hybrid vehicle, the braking assembly 50 actually returns energy to electrical circuit 10 by transforming the energy absorbed when slowing down the vehicle into high voltage electricity that can be directed back into the high voltage connection 14, thus regenerating energy to be used by other high voltage components or loads. Alternatively, the regenerated energy can be used to recharge the high voltage battery unit 18. The braking assembly 50 includes a control unit 54 that operates the braking assembly 50 and determines when to regenerate high voltage energy back into the high voltage connection 14. Sensors 56 assist in the control of the braking assembly 50 and an electrical device 58 is used to slow the vehicle down and create the energy, in such assemblies that provide the opportunity to harness the energy used to slow the vehicle down.

Returning attention to the power steering assembly 52, an electronic processing device 60 controls the transformation of the high voltage energy received from the high voltage connection 14 into a form of energy necessary to assist the driver in turning the steering wheel (not shown). A control unit 62 controls the receipt of high voltage energy from the high voltage connection 14 and provides outputs regarding consumption of energy. In several instances, the power steering assembly 52 would include a pneumatic drive; however, many power steering assemblies 52 are electric/electronic in nature. And similar to the braking assembly 50, an electric power steering assembly 52 would be advantageous in that it would only draw current when the steering wheel is being turned (pneumatic systems are required to be on constantly).

While there are several other components that are connected to the high voltage connection 14, the last to be illustrated in FIG. 1, and hence to be discussed herein, is the vehicle energy allocation manager (VEAM) 64. The VEAM 64 receives inputs from the control units 48, 32, 40, 54, 62 and determines the allocation of energy to each of the systems associated with each of the control units 48, 32, 40, 54, 62. A more complete discussion of the allocation process is set forth below.

More to the point, the VEAM 64 is an interface between the high voltage battery unit 18 and all of the high voltage components 12, 26, 34, 50, 52. The VEAM 64 receives information regarding the condition of the high voltage battery unit 18, as well as information regarding the needs of the high voltage components 12, 26, 34, 50, 52 through each of the control units 48, 32, 40, 54, 52, respectively. The VEAM 64 will then use a calculation to determine which of the high voltage components 12, 26, 34, 50, 52 are to receive what portion of the power available from the high voltage battery unit 18 and when. The VEAM 64 ensures the optimal performance of the vehicle, its high voltage battery unit 18 and the high voltage components 12, 26, 34, 50, 52 when the capacity of the high voltage battery unit 18 cannot meet the needs placed thereupon in real time.

Figure 2:
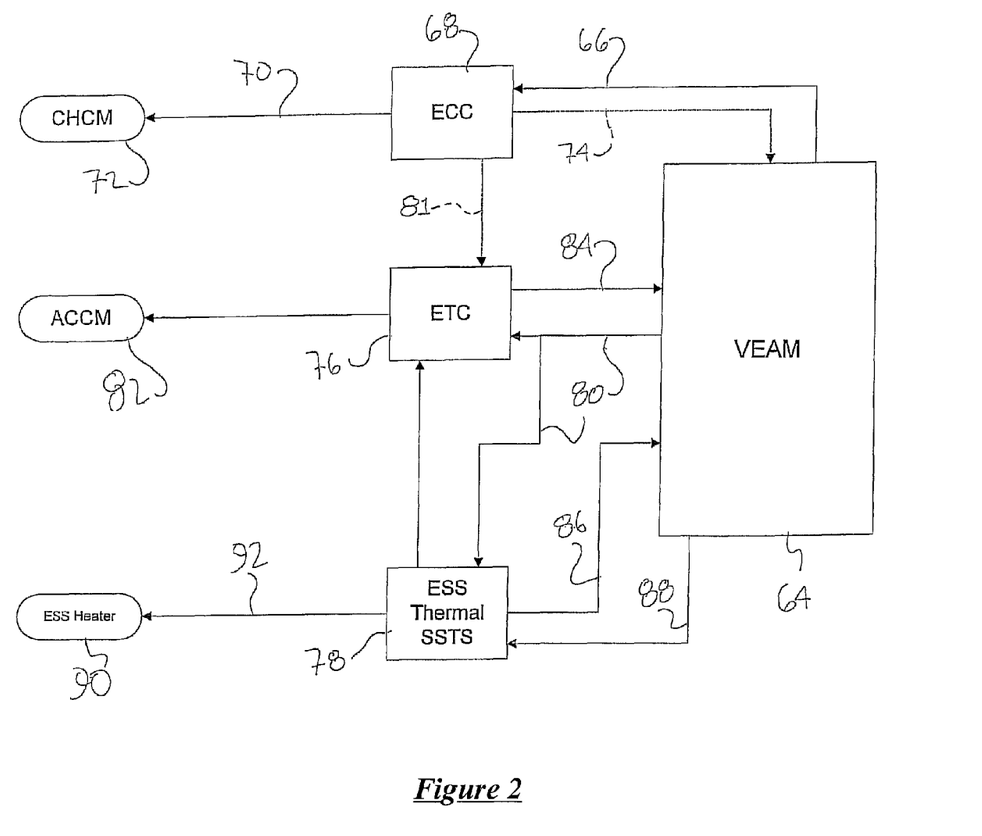
FIG. 2 is a schematic drawing of the vehicle energy allocation manager and how it communicates with components related to temperature.
Figure 3:
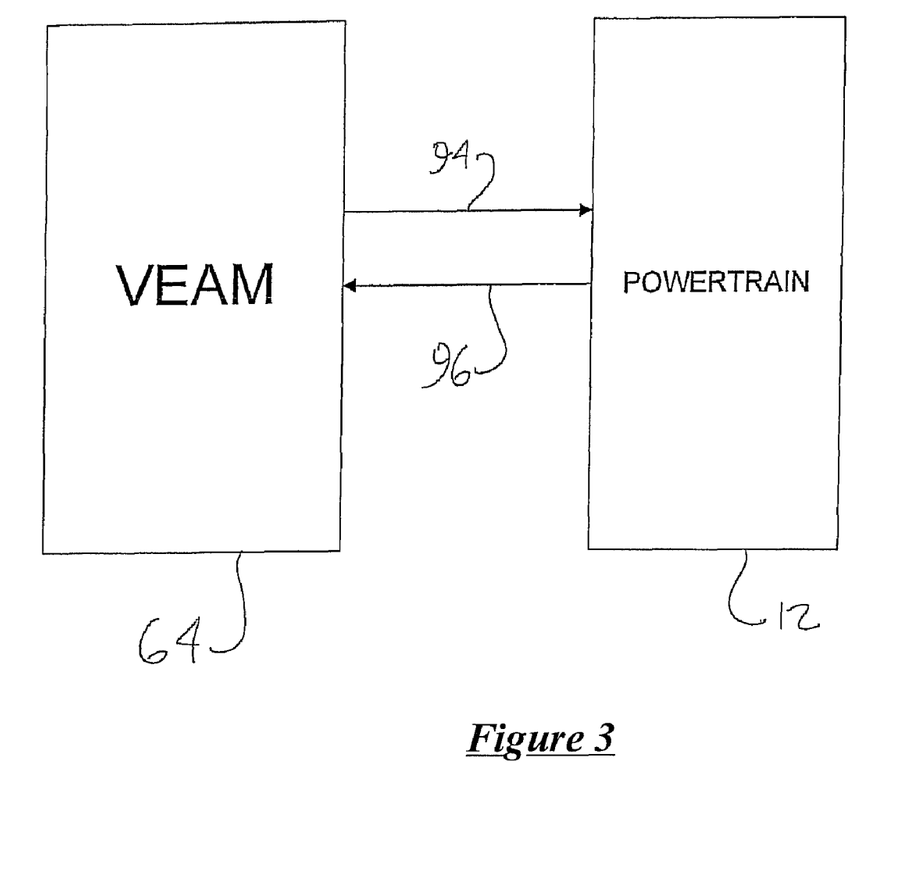
FIG. 3 is a schematic drawing of the vehicle energy allocation manager communicating with the power train.
Figure 5:
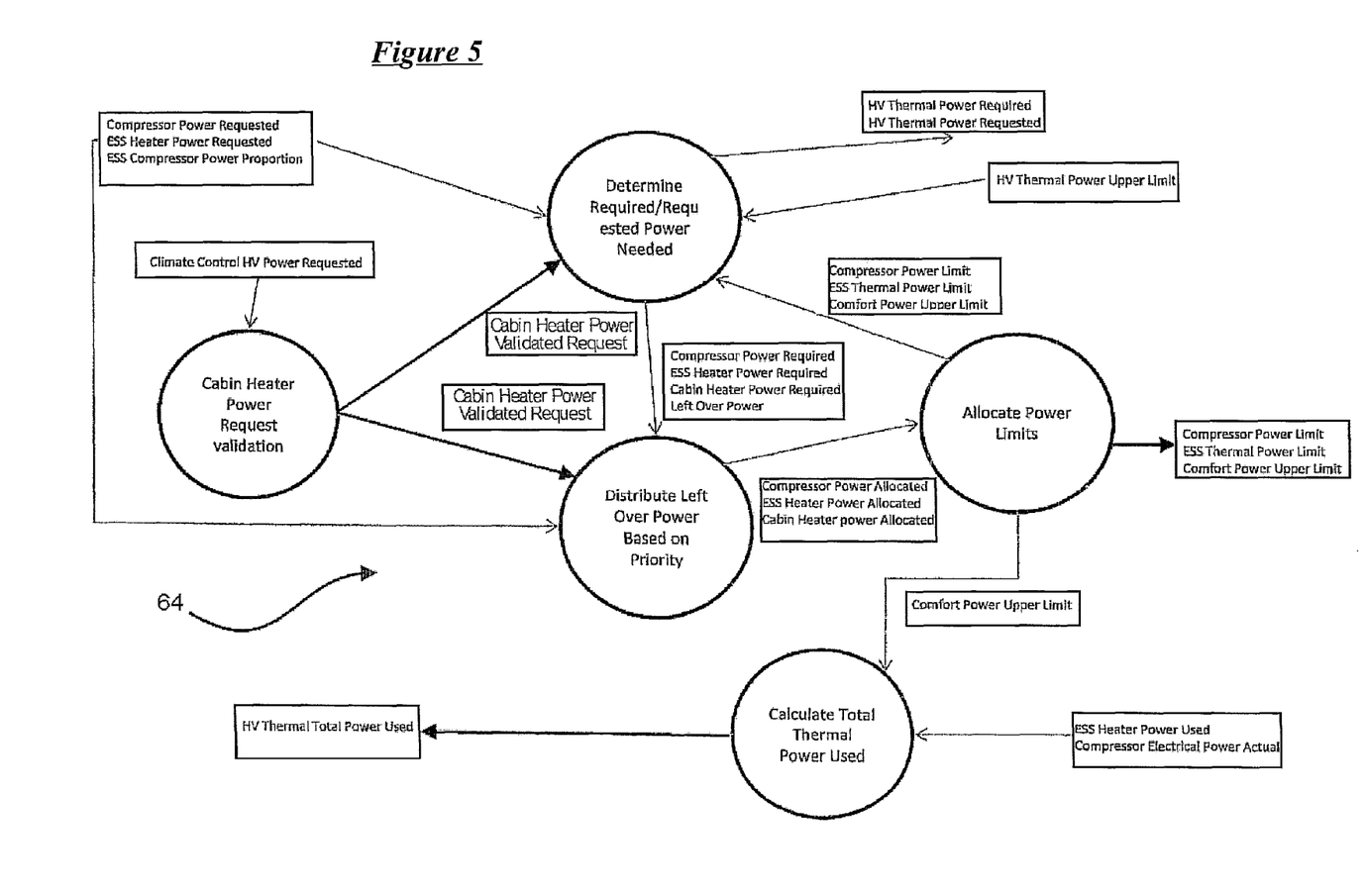
FIG. 5 is a logic chart illustrating the architecture of the vehicle energy allocation manager.

To better describe the VEAM 64, reference is made to FIGS. 2, 3 and 5. Referring specifically to FIG. 2, the VEAM 64 is shown controlling the power limits of three different thermal devices. The VEAM 64 provides a comfort power upper limit through connection 66 to an electronic climate control system 68. The electronic climate control system 68 provides a power command through line 70 to a coolant heater control module 72 used to control the climate in the passenger compartment of the vehicle. A climate control power request is provided through line 74, which is shown to be a dashed line in FIG. 2 to represent the fact that the VEAM 64 can ignore a power request such as this if the VEAM 64 determines that there is not enough power for all components.

Compressor power limits are sent from the VEAM 64 to an electronic thermal control 76 and an energy storage system thermal subsystem 78 through a line 80. The electronic thermal control 76 also receives climate control target temperatures through line 81, dashed to represent these targets can be ignored if necessary. The electronic thermal control 76 sends an RPM command to an accessory air conditioning compressor module 82. The electronic thermal control 76 also sends compressor power requested, energy storage system compressor power proportion, and compressor electrical power consumed information back to the VEAM 64 through line 84 providing the interface for the VEAM 64 to control the power consumed by the compressor during power limited events. Note that in this case, one compressor is used for both cabin conditioning and battery thermal conditioning. It should be noted, however, that the VEAM 64 also has the ability to control compressor power usage for two separate compressors designed to control cabin conditioning and ESS thermal conditioning separately.

The VEAM 64 receives an energy storage system power request and an energy storage system power used signal from the energy storage system 78 through a line 86. The VEAM 64 provides a power limit to the energy storage system thermal subsystem 78 through a line 88. With this limit, the energy storage system thermal subsystem technical specification 78 provides an energy storage system heater 90 a power command through a line 92. This provides the interface that allows the VEAM 64 to control the power consumed by the battery heater 90 during power limited events.

Referring to FIG. 3, the VEAM 64 and the power train 12 provide information therebetween. The VEAM 64 sends to the power train 12 the high voltage power required, the load power requested and the instantaneous total power used by all high voltage loads regulated by the VEAM 64, excluding the power train system 12 through a line 94. The upper and lower thermal power limits determined by the power train 12 are sent to the VEAM 64 providing the interface to determine the power available to the high voltage loads regulated by the VEAM 64. The amount of thermal power required provides the interface that allows the VEAM 64 to force the power train system 12 to consume less high voltage power thus reducing power available for the propulsion system during power limited conditions and increasing the amount of power available to meet the power needs of other high voltage subsystems controlled by the VEAM 64. This interface provides the VEAM 64 with the control necessary to modulate the high voltage energy available to the vehicle while inhibiting the poor performance of any one given subsystem controlled by the VEAM 64 during power limited events.

Figure 4:
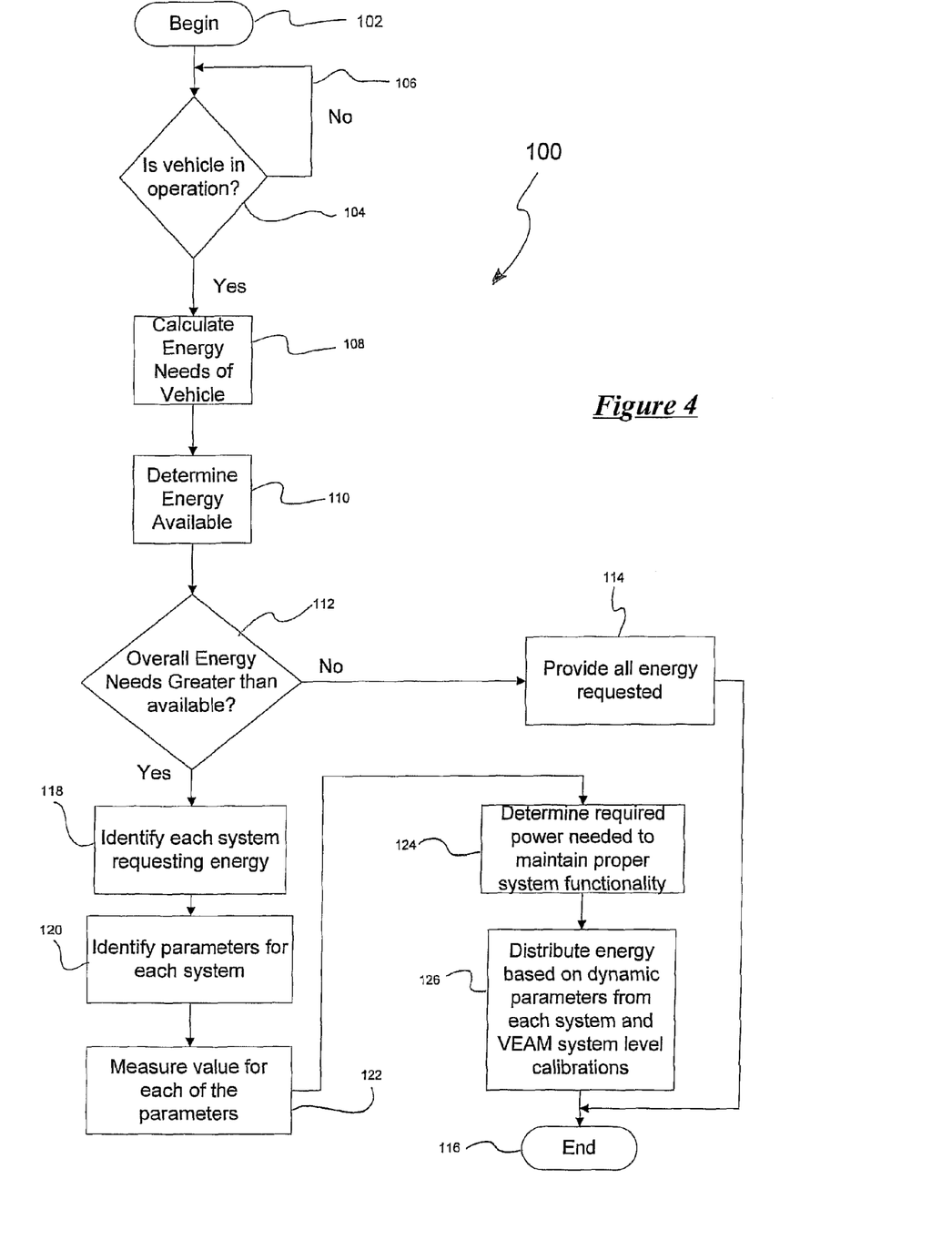
FIG. 4 is a flow chart illustrating an exemplary method for allocating energy in a high voltage system shown in FIG. 1.

Referring to FIG. 4, the inventive method is generally indicated at 100. The method 100 begins at 102. Because this method 100 is used when the vehicle is being moved, the first decision is to determine whether the vehicle is being operated at 104. If not, the method 100 loops back at 106 and waits for the vehicle to be operated. Once in operation, the method 100 calculates the energy need by the high voltage components of the vehicle at 108. Then, a determination is made at 110 as to the energy that is available to operate the vehicle.

From here, the method 100 calculates whether the overall energy needed is greater than that which is available at 112. If the overall energy needed is not greater than what is available, all of the energy is provided at 114 and the method 100 terminates at 116.

When it is determined that all of the energy available is not enough, the method 100 is used to resolve the issue of how the energy is distributed in a manner that will not disrupt operation the high voltage components or systems 12, 26, 34, 50, 52 or leave its occupants in a poorly functioning vehicle. The method 100 identifies each high voltage component or system that is requesting energy at 118. A parameter or multiple parameters for each high voltage component or system is/are identified at 120. A parameter is something specific to the high voltage component that may affect its ability to operate when operating at or near that parameter. For example, to maximize the discharge of the energy storage system or high voltage battery unit 18, it may be determined that the temperature is the parameter to be measured. If the temperature is below an ideal value, then it might be determined that the energy storage system heater 90 should be turned on for at least a portion of the time that the vehicle is operating. The further away the temperature of the energy storage system is from its ideal temperature, the more energy is supplied to the energy storage system heater 90 to allow the energy storage system 18 to reach its ideal temperature.

Once the parameters are identified, a value is measured for each of the parameters at 122. These parameters are used in algorithms that determine the power required for the high voltage device to ensure proper subsystem functionality and performance. Calculating energy loss is a specific type of method used to determine required power and is calibrated for some high voltage components or systems at 124. The energy is then distributed to the various high voltage components (and sometimes a subset thereof) based on the calibrations and dynamic parameters at 126. Once the proper distribution of available high voltage energy is complete, the method terminates at 116.

Figure 6:
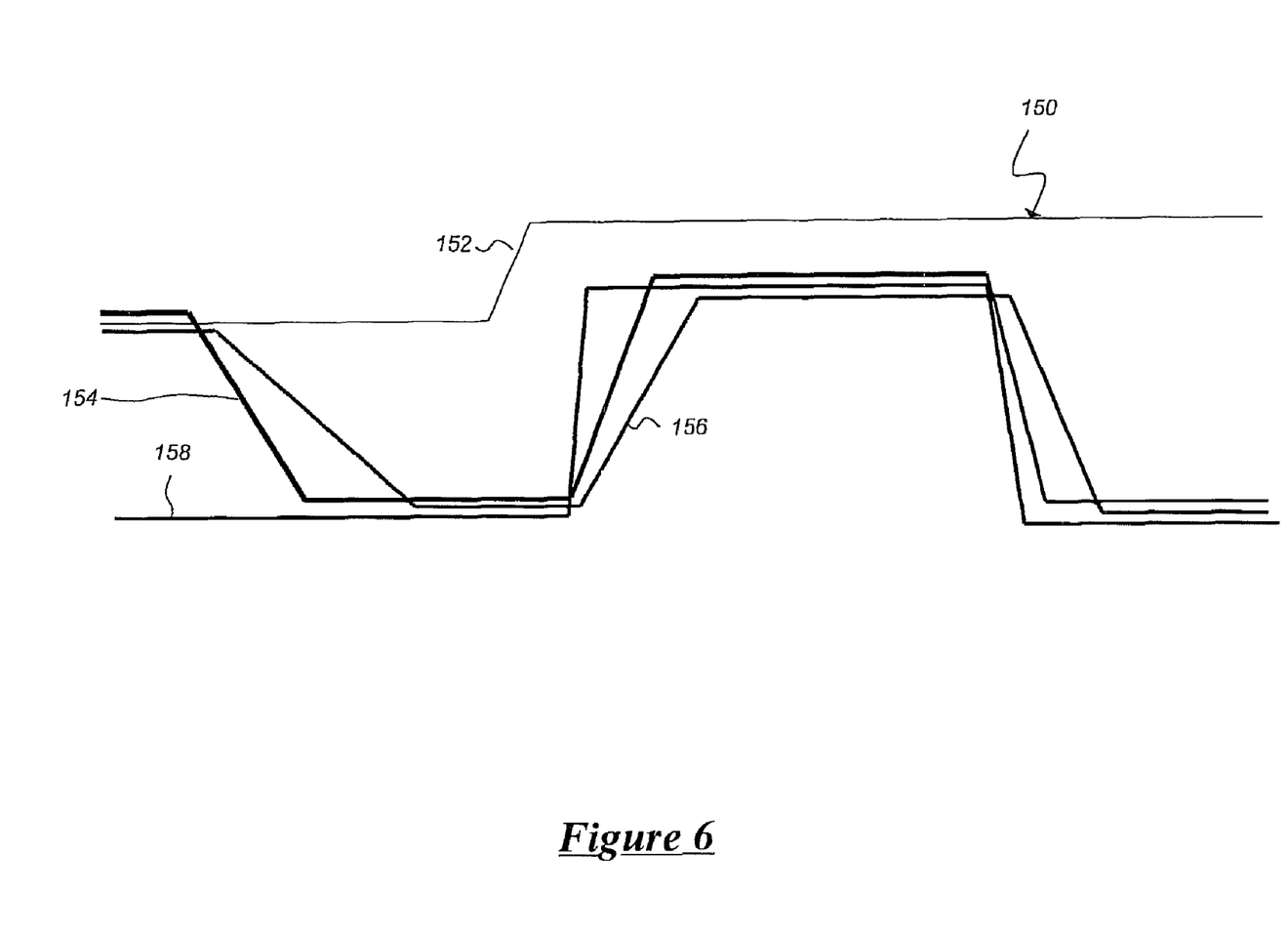
FIG. 6 is a graph representing a calculation of power loss by a high voltage component employing the inventive method.

Turning attention to FIG. 6, a graphic example of the calculation of energy loss is shown in terms of power. In this example, the battery thermal system 26 is requesting an amount of power 150. A step 152 in the line 150 represents a dynamic real time request for more power. Due to the conditions of the vehicle and the amount of power available to all systems, a power limit 154 is imposed on the battery thermal system 26. The power used by battery thermal system 26 is represented by line 156. The power used 156 by the battery thermal system 26 approximates the power limit 154 (although ramp up and ramp down times may vary due to external conditions) when the power limit 154 drops below the power request 150. The floor of the power level acceptable to battery thermal system 26 is the minimum power loss required 158. If the minimum power loss 158 steps up, so does the power used 156. As may be appreciated, the total energy loss of the battery thermal system 26 is the integral of the area between the power requested 150 and the power used 156 over time.

The method 100 contemplates the changing of the calibration as the parameter changes. If the temperature should fall, the parameter used to determine how much high voltage energy should be sent to the high voltage component is changed to account for this new situation. The table below illustrates the amount of energy that a specific device loses before shifting to a specific "required power."

| Parameter | Value | Energy Loss Threshold |
| --- | --- | --- |
| ESS Cell Temp Index 1 (high) | −40 | 0 |
| ESS Cell Temp Index 2 | −20 | .5 kWh |
| ESS Cell Temp Index 3 | −10 | 1 kWh |
| ESS Cell Temp Index 4 | 0 | 2 kWh |
| ESS Cell Temp Index 5 | 5 | 30 kWh |
| ESS Cell Temp Index 6 | 10 | 30 kWh |
| ESS Cell Temp Index 7 | 20 | 30 kWh |
| ESS Cell Temp Index 8 | 25 | 30 kWh |
| ESS Cell Temp Index 9 | 40 | 30 kWh |
| ESS Cell Temp Index 10 (low) | 50 | 30 kWh |

In the above calibration table, the energy loss threshold represents the how much loss a particular high voltage component can tolerate given the value of the parameter. Therefore, in the case when the parameter is temperature and the value of the temperature is −40, the power loss threshold is 0 because the high voltage component cannot tolerate any loss of energy and requires to be on as long as it takes to heat the particular cell. As the temperature increases, the high voltage component can tolerate a loss of power because it can handle the breaks in power distribution thereto because the condition (parameter) is not as extreme. As such, the VEAM 64 recalibrates the needs of all of the high voltage components based on the new parameter measurement. It should be appreciated by those skilled in the art that the energy loss threshold could be replaced with a time variable in which a high voltage component could be turned off without adding an inventive concept to the invention.

Below is a second calibration table. This table represents the amount of power needed by a particular high voltage component at various temperatures. This calibration provides a second limit that prevents calibration from limiting power too much to any one high voltage component.

| Parameter | Value | Power Required |
| --- | --- | --- |
| RESS Cell Temp Index 1 (high) | −40 | 3 kW |
| RESS Cell Temp Index 2 | −20 | 2 kW |
| RESS Cell Temp Index 3 | −10 | 1 kW |
| RESS Cell Temp Index 4 | 0 | .5 kW |
| RESS Cell Temp Index 5 | 5 | 0 |
| RESS Cell Temp Index 6 | 10 | 0 |
| RESS Cell Temp Index 7 | 20 | 0 |
| RESS Cell Temp Index 8 | 25 | 0 |
| RESS Cell Temp Index 9 | 40 | 0 |
| RESS Cell Temp Index 10 (low) | 50 | 0 |

The RESS represents a rechargeable energy storage system which is similar to the energy storage system shown above. The only difference is between these two system is that one is rechargeable and the other is refillable.

Continuing with this example, FIG. 5 represents the controls architecture of the VEAM 64 when the various systems of the vehicle, namely the cabin heater 34, the energy storage heater 18, and the compressor request power in order to thermally condition the battery or the cabin. The VEAM 64 takes the inputs from each system requesting power, analyzes the parameters relative to each system with the system calibrations and determines the required power for each high voltage device requesting power. The power limits are then calculated and power is distributed among the various high voltage components.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for calibrating the amount of power distributed to a vehicle having high voltage components, the method comprising the steps of:
   (a) calculating a power needed to operate the high voltage components;
   (b) measuring an amount of power available to operate the high voltage components;
   (c) determining whether the amount of power available is less than the power needed;
   (d) identifying a parameter for each of the high voltage components;
   (e) calibrating a dynamic distribution of power based on the parameter when the amount of the power available is less than the amount of the power needed, such that the distribution of power maintains an optimal operation of the high voltage components in a manner that optimizes operation of the vehicle; and
   (f) recalibrating the dynamic distribution of power as the parameter for each of the high voltage components changes during the operation of the vehicle.

2. A method as set forth in claim 1 wherein the step of calculating the power needed includes the step of defining a current operating condition of the vehicle.

3. A method as set forth in claim 2 including the step of identifying each of the high voltage components requesting power.

4. A method as set forth in claim 3 including the step of identifying a parameter for each of the high voltage components and each subsystem used to control each of the high voltage components.

5. A method as set forth in claim 4 including the step of calibrating energy loss of the high voltage components based on the parameters.

6. A method as set forth in claim 5 including the step of providing uncalibrated power to all of the high voltage components when the amount of the energy available exceeds the energy needed.

7. A method as set forth in claim 5 further including the step of increasing the amount of power distributed to a high voltage component when the amount of energy available increases.

8. A method as set forth in claim 7 including the step of measuring a difference between the amount of power needed and the amount of power distributed to the high voltage components.

9. A method as set forth in claim 8 wherein the step of calculating the power needed includes the step of defining a current operating condition of the vehicle.

10. A method as set forth in claim 9 including the step of measuring a difference between the amount of power needed and the amount of power distributed to the high voltage components.

11. A method as set forth in claim 5 wherein one of the high voltage components is a high voltage power train used to propel the vehicle.

12. A method as set forth in claim 11 further including the step of increasing the amount of power distributed to one of the high voltage components by reducing the amount of power available to the high voltage power train.

13. A method as set forth in claim 12 wherein the step of identifying the parameter includes identifying a plurality of parameters for a plurality of conditions.

14. A method as set forth in claim 13 including the step of calibrating energy loss based on the parameters.

15. A method as set forth in claim 14 including the step of avoiding the step of measuring the difference if the step of increasing the calibration maximizes the calibration value.

16. A method as set forth in claim 11 including the step of limiting the amount of power delivered to one of the high voltage components other than the high voltage power train to increase the power available to the high voltage power train based on dynamic conditions and the parameters.

17. A method as set forth in claim 16 including the step of selecting one of the plurality of parameters when one of the plurality of conditions exists.

18. A method as set forth in claim 17 further including the step of increasing the amount of power distributed to a high voltage component when the amount of power available increases.

19. A method for calibrating the amount of power distributed to a vehicle having high voltage components, including a high voltage power train, a high voltage steering assembly and a high voltage braking assembly, the method comprising the steps of:
   (a) calculating a power needed to operate the high voltage components;
   (b) measuring an amount of power available to operate the high voltage components;
   (c) determining whether the amount of power available is less than the power needed;
   (d) identifying a parameter for each of the high voltage components; and
   (e) calibrating a distribution of power based on the parameter when the amount of the power available is less than the amount of the power needed, such that the distribution of power maintains the operation of the high voltage power train, the high voltage steering assembly and the high voltage braking assembly in a manner that optimizes the operation of the vehicle.

20. A method as set forth in claim 19 including the step of identifying each of the high voltage components requesting power.

21. A method as set forth in claim 20 including the step of increasing a calibration value when the parameter measured identifies a lack of need for the high voltage component.

22. A method for calibrating the amount of power distributed to a vehicle having high voltage components, including a high voltage power train, a high voltage cabin thermal system and a high voltage battery thermal system, the method comprising the steps of:

(a) calculating a power needed to operate the high voltage components;
(b) measuring an amount of power available to operate the high voltage components;
(c) determining whether the amount of power available is less than the energy needed; and
(d) calibrating a distribution of power when the amount of the power available is less than the amount of the power needed, such that the distribution of energy maintains the operation of the high voltage power train, the high voltage cabin thermal system and the high voltage battery thermal system in a manner that optimizes the operation of the vehicle.

* * * * *